US006048117A

United States Patent [19]
Banton

[11] Patent Number: 6,048,117
[45] Date of Patent: Apr. 11, 2000

[54] NETWORK-BASED SYSTEM FOR COLOR CALIBRATION OF PRINTERS

[75] Inventor: Martin E. Banton, Fairport, N.Y.

[73] Assignee: Xerox Corporation, Stamford, Conn.

[21] Appl. No.: 09/074,834

[22] Filed: May 8, 1998

[51] Int. Cl.[7] .................................................. B41J 3/42
[52] U.S. Cl. ...................................... 400/120.09; 400/74
[58] Field of Search ................................ 400/120.09, 76, 400/70, 61, 74; 382/162, 100, 183

[56] References Cited

U.S. PATENT DOCUMENTS

| 5,594,557 | 1/1997 | Rolleston et al. | 358/518 |
|---|---|---|---|
| 5,689,350 | 11/1997 | Rolleston | 358/504 |
| 5,760,913 | 6/1998 | Falk | 358/298 |
| 5,801,853 | 9/1998 | Yamada et al. | 358/504 |
| 5,809,213 | 9/1998 | Bhattacharjya | 395/106 |
| 5,898,823 | 4/1999 | Sorkin et al. | 395/114 |
| 5,946,414 | 8/1999 | Cass et al. | 382/183 |

FOREIGN PATENT DOCUMENTS 0 549 315 A1  12/1992  European Pat. Off. .

*Primary Examiner*—John S. Hilten
*Assistant Examiner*—Charles H. Nolan, Jr.
*Attorney, Agent, or Firm*—Fay, Sharpe, Fagan, Minnich & McKee, LLP

[57] ABSTRACT

A printing device is requested to generate a calibration test print. The printer generates a plurality of color patches and identification data which are put in hard copy form by a marker. The identification data includes data such as device identifiers, calibration print identifiers, and calibration statistics for the printing device. The hard copy calibration print is scanned and is transmitted to a calibration server. The calibration server interprets the coded data and determines the originating device, the calibration pattern printed, and an optimal color pattern based on the identification data. The color pattern printed is then compared to the optimal color pattern and their differences are determined. A color correction table is generated based on the differences and transmitted to the network address of the originating printer based on the identification data. The identification data provides for automatic recalibration of printing devices on a network.

23 Claims, 2 Drawing Sheets

NETWORK-BASED SYSTEM FOR COLOR CALIBRATION OF PRINTERS

BACKGROUND OF THE INVENTION

The present invention relates to the color imaging arts. It finds particular application in calibrating color printers and refining color correction tables and will be described with particular reference thereto. It is to be appreciated, however, that the invention will also find application in other printing devices such as multi-function devices and plotters.

Computers and other electronic equipment have typically generated three-dimensional RGB (red, green, blue) color signals. Many printers, however, receive four-dimensional CMYK (cyan, magenta, yellow, and black) signals as input and print output colors which are measured as corresponding RGB values. A look-up table is commonly provided to convert each digital RGB color signal value to a corresponding digital CMYK value before being received by the printer.

A printer which has an ideal dye behavior has a one-to-one correspondence of cyan-to-red, magenta-to-green, and yellow-to-blue. This means that when printed, the cyan ink will only absorb red light, the magenta ink will only absorb green light, and the yellow ink will only absorb blue light. However, printers inherently have a non-ideal dye behavior and therefore have a complex non-linear calorimetric response. Interactions between the cyan, magenta, and yellow inks exist which result in unwanted absorptions of reds, greens, and blues. Even once a printer is calibrated such that one or a range of input digital CMYK values produce the proper color(s), the full spectrum of CMYK values and printed colors is not accurate. In other words, the colors asked to be printed and the actual colors printed are not the same.

This discrepancy arises because the relationship between digital values that drive the printer and the resulting calorimetric response is a complex non-linear function. Labeling the response, or other values, as "colorimetric" indicates that the response or value has been measured by an instrument. Modeling the colorimetric response to achieve linearity across the available spectrum usually requires many parameters. Typically, a color correction look-up table is built which approximates the mapping between RGB colorimetric space and CMYK values. Each RGB coordinate is typically represented by an 8-bit red value, an 8-bit green value, and an 8-bit blue value. Although the RGB coordinate is capable of addressing a look-up table having $256^3$ locations, measuring and storing $256^3$ values is expensive. The look-up table is typically partitioned into a smaller size such as 16×16×16 (4096) table locations, each of which stores a four-dimensional CMYK value. Other CMYK values are then found by interpolating the known CMYK values using an interpolation process, for example, trilinear or tetrahedral interpolation.

The look-up table is built by sending a set of CMYK digital values to the printer, measuring the colorimetric RGB values of the resulting color patches outputted by the printer, and generating the look-up table from the difference between the inputted values and the measured outputted values. More specifically, the color correction look-up table corrects for non-linearities and unwanted absorptions of inks such that the printer prints the true corresponding color.

After the color correction table is generated, the printer response tends to drift over time. To correct for the drift, the device is adjusted or recalibrated periodically. Recalibrating the correction table involves printing and remeasuring a set of test color patches which are then compared to an original set of color patches by calibration software. Remeasuring, however, is typically performed by a scanner or other measuring device which is remote from the printer being recalibrated. In this case, an operator must manually reconfigure the scanner and calibration software to properly recognize and measure the test color patches. This assumes that the operator can properly identify the test color patches being tested in accordance with the original printer and its test pattern properties. Furthermore, once a color correction table is generated, it must be associated with the correct printer, otherwise, a different printer will be recalibrated with an incorrect correction table.

The present invention provides a new and improved method of calibrating a color printer which overcomes the above-referenced problems and others.

SUMMARY OF THE INVENTION

In accordance with one embodiment of the present invention, a method of generating a calibration print for calibrating a printing device is provided. The printing device generates the calibration print which includes a color patch pattern based on an input test pattern. The calibration print is encoded with coded data such that the calibration print is identifiable.

In accordance with another embodiment of the present invention, a method of recalibrating a color printer in data communication with a network of devices is provided. An output color pattern is printed with a color printer based on a predetermined input color pattern. The output color pattern is encoded with identification data. The output color pattern is measured and the identification data is interpreted. A calibration pattern is selected based on the identification data and differences are determined between the calibration pattern and the measured output color pattern. A color correction table is generated based on the differences determined. The color printer is then recalibrated with the color correction table by identifying the color printer and transferring the color correction table to the identified color printer based on the identification data.

One advantage of the present invention is that a printing device on a network can be automatically recalibrated.

Another advantage of the present invention is that a calibration print is unambiguously identified such that a proper calibration is performed with an appropriate optimal calibration pattern. A color correction table is then generated and automatically transmitted over the network to the originating printing device based on the coded data.

Another advantage of the present invention is that calibration and performance histories can be generated for each printing device on the network since frequencies of calibrations and amount of drift can be determined based on the coded data.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
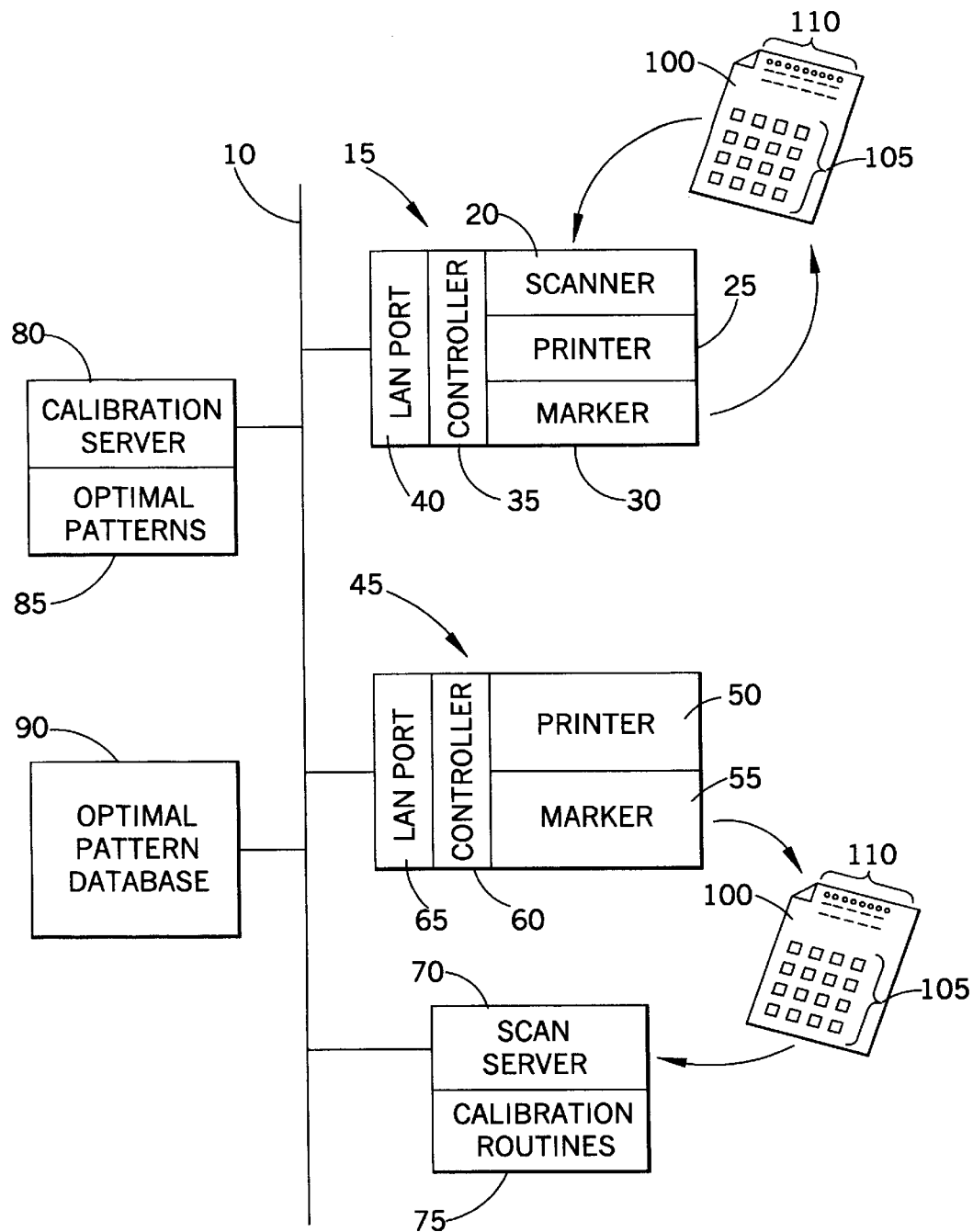
FIG. 1 illustrates a network calibration system including a plurality of printing devices which output a calibration print having coded data printed thereon in accordance with the present invention.

With reference to FIG. 1, a network includes a communications medium 10 which allows a plurality of devices to be in data communication with each other. An exemplary network includes a multi-functional device 15 which has a scanner 20, a printer 25, a marker 30, a controller 35, and a LAN port 40 which connects the multi-functional device 15 to the network communication medium 10. A non-multi-functional device 45, for example, a printer, includes printing 50 and marking 55 functions, a controller 60, and a LAN port 65 which provides connection to the communications medium 10. Of course, other types of color printing devices may be included. A scan server 70 includes a scanner which scans hard copy documents and converts them into digital form. Optionally, the scan server 70 includes a calibrator 75 which contains a plurality of calibration test patterns. With the calibrator 75, the scan server can calibrate an inputted color patch pattern. A calibration server 80 is a device configured to perform calibrations based on received color patch test patterns. The calibration server 80 includes a plurality of optimal color patterns 85 which represent a desired printed output based on a selected input test pattern. Optionally, the optimal color patterns may be contained in a separate database 90 which is accessible by the calibration server.

Figure 2:
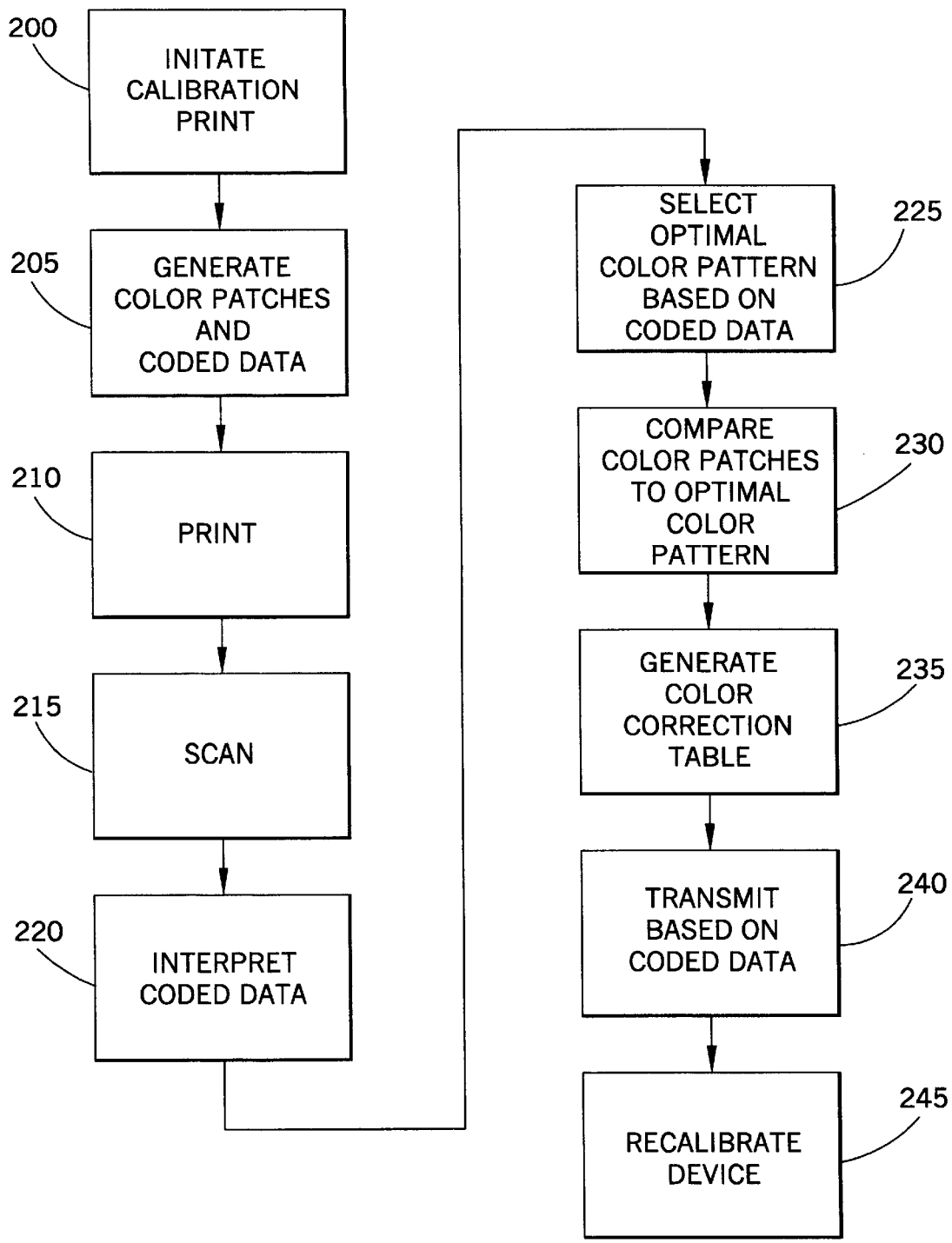
FIG. 2 illustrates a calibration process in accordance with the present invention.

With reference to FIGS. 1 and 2, to calibrate a printing device, such as the multi-functional device 15, the device or a user initiates calibration 200 by requesting the multi-functional device 15 to generate 205 an electronic test pattern 100. The test pattern 100 includes a plurality of color patches 105 in response to an input color pattern. Identification coded data 110 is generated for the test pattern 100 and includes data representing properties of a desired calibration output print. In other words, the identification data 110 indicates what the output print should be based on the input test pattern. Exemplary identification data includes printing device type and/or serial number, calibration test pattern number, orientation of calibration test pattern, network address of device, network address of system administrator, network address of service center, date, time, device status, and calibration statistics. The device status may include properties such as number of prints made during the calibration print, number of calibrations performed over a time duration, control set points, and current options installed on the printing device. The identification data 110 may also identify the media type on which the calibration test pattern 100 is printed. Printing on different media types may produce variations in the printed test pattern. As such, to properly analyze the test pattern 100, the calibration server can make appropriate adjustments based on the known media type.

With further reference to FIG. 2, the test color patches 105 and coded data 110 are printed 210 together in hard copy form as the test pattern 100. The hard copy may be one or more pages long depending on the input test pattern. The calibration print hard copy 100 is then fed to a scanning device such as in the scan server 70 or in the multi-functional device 15 and scanned 215. The scanned calibration data is transmitted through the network to the calibration server 80 which reads and interprets 220 the coded data 110. Before a calibration is performed, the calibration server 80 must know information about the calibration print 100 such as where it came from, what type of device generated it, and the format of the color patch data 105. Determining this and other information from the coded data which identifies the calibration print 100, the calibration server 80 identifies and retrieves an appropriate optimal color pattern which will be compared to the calibration print 100. The coded data 110 identifies the optimal color pattern in accordance with the input test pattern used to generate the calibration print 100. The calibration server selects 225 the optimal color pattern from its database of color patterns 85 or from the remote database 90.

The calibration print is then analyzed 230 by interpreting the color patches 105 generated by the printing device and compared to their corresponding color patches from the optimal color pattern. The differences between the calibration print 100 (e.g., what was actually printed) and the optimal color pattern (e.g., what should have been printed) forms the basis of adjustment values used for generating 235 a color correction table.

Once the color correction table is generated, it is transmitted 240 to the correct printing device based on the coded data 110 which includes data such as the source and location of the calibration print 100. The color correction table is transmitted across the network and sent to the network address of the printing device as determined from the coded data 110. Alternately, the color correction table may be stored to a floppy disk and physically transferred to the printing device to be calibrated. In this manner, before the color correction table is installed in the printing device, a verification step is performed to verify that the color correction table belongs to the associated printing device. This is accomplished by checking the network address and printing device identification from the coded data 110 attached to the color correction table. The coded data 110 assures that a printing device is not calibrated with a different printing device's color correction table. Once it is verified that the color correction table is properly received, the old color correction table is replaced with the new color correction table, thus, recalibrating 245 the printing device.

In the preferred embodiment, the identification data is coded in a binary format using glyphs which is a development of the present assignee. Glyphs include a forward slash "/" and a backward slash "\" which represent "on" and "off" signals. The forward and backward slashes are advantageous over the typical "1" and "0" binary characters because the slashes are more easily distinguishable. Of course, any series or combination of alphanumeric characters or graphic symbols may be used to encode the identification data 110.

By encoding calibration statistics about each printing device on the calibration print 100, a performance history can be tracked and monitored for each printing device. During the calibration, the printing device is identified from the coded data 110 on the calibration print 100 and the amount of drift is determined during the calibration analysis step 230. A variety of statistics can be determined from this information for each printing device. For example, the frequency of calibrations performed for a device and a value representing an amount of drift occurring since the last calibration. If the device is drifting an unreasonable amount over a short time period, this would indicate that the device may need servicing. Frequent calibrations performed on a device may also indicate a degree of customer usage.

With the identification data 110 associated with a calibration print 100, the calibration process can identify which device printed the calibration print 100, what test pattern was printed, what an optimal output pattern should be, what format the color correction data should be in, and where to send the color correction data. The identification data 110 eliminates the need for a user to be involved in the recalibration process. Even in the scanning process, having the identification data 110 on the calibration print 100, a scanner can unambiguously scan the calibration print 100 and know the type and location of color patches it is looking for.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the preferred embodiment, the invention is now claimed to be:

1. A method of recalibrating a color printer in data communication with a network of devices, the method comprising the steps of:

printing an output color pattern with a color printer based on a predetermined input color pattern;

printing identification data in association with the output color pattern for encoding the output color pattern with the identification data;

detecting the output color pattern and the identification data with a scanner;

selecting a calibration pattern based on the identification data and determining differences between the calibration pattern and the measured output color pattern;

generating a color correction table based on the differences determined; and recalibrating the color printer with the color correction table by identifying the color printer and transferring the color correction table to the identified color printer based on the identification data.

2. The method as set forth in claim 1 wherein the encoding includes encoding a source identifier and a location identifier including a network address of the color printer.

3. The method as set forth in claim 2 wherein the transferring transfers the color correction table to the network address.

4. The method as set forth in claim 1 wherein the encoding includes encoding properties of the predetermined input color pattern including pattern identification and pattern orientation such that the calibration pattern selected is a desired output pattern which is generated in response to the predetermined input color pattern.

5. The method as set forth in claim 1 wherein the identification data is encoded in a binary format.

6. The method as set forth in claim 1 wherein the identification data includes alphanumeric characters.

7. The method of calibrating as set forth in claim 1 further including generating a performance history for the color printer based on the identification data and the differences determined.

8. The method of calibrating as set forth in claim 1 wherein the steps of printing and encoding are performed concurrently.

9. A method of calibrating a color printing device comprising the steps of:

generating, with a color printing device, a color calibration print and coded data, the coded data representing properties of an optimal output for the color calibration print;

analyzing the color calibration print, coded data, and the optimal output;

generating a color correction table for adjusting the color printing device based on the analyzing; and calibrating the color printing device by transmitting the color correction table to the color printing device in accordance with the coded data.

10. The method of calibrating as set forth in claim 9 wherein the analyzing includes:

scanning the color calibration print and coded data;

interpreting the coded data; and comparing the color calibration print to the optimal output print and determining adjustment values for the color correction table, the optimal output print being selected based on the coded data.

11. The method of calibrating as set forth in claim 9 wherein the coded data includes a network address and data identifying the color printing device which generates the color calibration print.

12. The method of calibrating as set forth in claim 11 further including identifying the color printing device from the coded data.

13. The method of calibrating as set forth in claim 11 further including verifying a destination of the color correction table prior to the transmitting.

14. The method of calibrating as set forth in claim 9 wherein the coded data is generated in a binary format.

15. The method of calibrating as set forth in claim 9 further including generating a performance history for the color printing device based on the coded data and the adjustment values determined.

16. In a method of generating a calibration print for calibrating a printing device where the printing device generates the calibration print including a color patch pattern based on an input test pattern, the improvement comprising:

encoding the calibration print with coded data representative of the color patch pattern such that the calibration print is identifiable.

17. The method as set forth in claim 16 wherein the coded data includes data identifying the printing device and the color patch pattern.

18. The method as set forth in claim 17 further including recalibrating the printing device based on the color patch pattern and coded data.

19. The method as set forth in claim 18 further including generating calibration statistics for the printing device based on the coded data.

20. The method as set forth in claim 18 wherein the recalibrating includes:

generating a correction table; and transmitting the correction table to the printing device in accordance with the coded data.

21. The method as set forth in claim 20 wherein the generating includes:

selecting an optimal color pattern based on the coded data which identifies the optimal color pattern in accordance with the input test pattern; and determining a drift between the optimal color pattern and the color patch pattern of the calibration print.

22. The method as set forth in claim 16 further including generating a calibration performance history for the printing device based on the coded data.

23. A color printing apparatus comprising:

a color printing device for generating a color calibration print and coded data, the coded data representing properties of an optimal output for the color calibration print, a calibration server for analyzing the color calibration print, coded data, and the optimal output and for generating a color correction table for adjusting the color printing device based on the analyzing; and means for transmitting the color correction table to the color printing device in accordance with the coded data.

* * * * *